Aug. 31, 1937.  J. H. COHEN  2,091,910
SPLASH GUARD
Filed Aug. 17, 1935
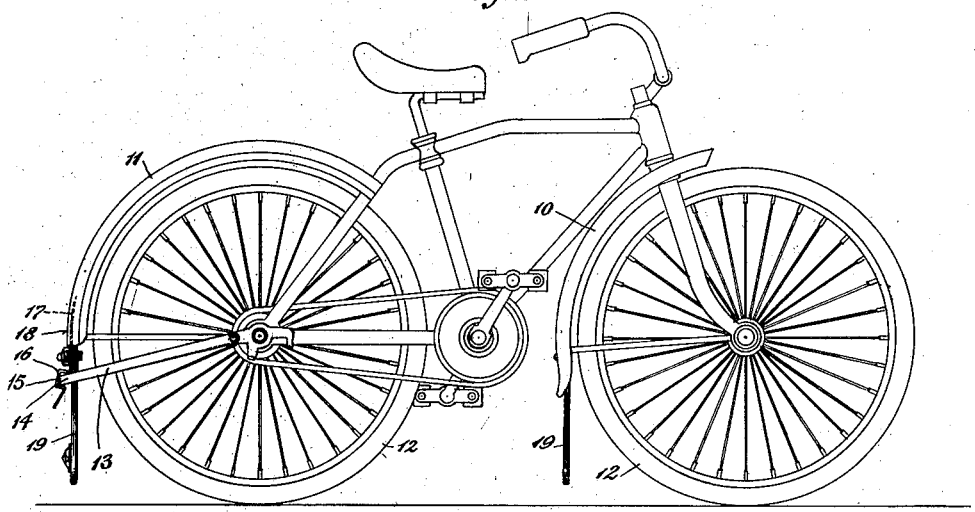
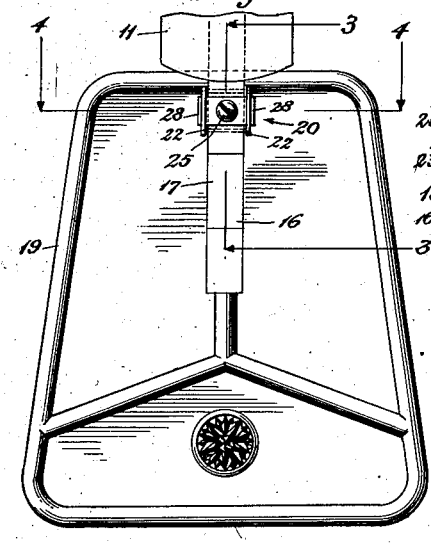
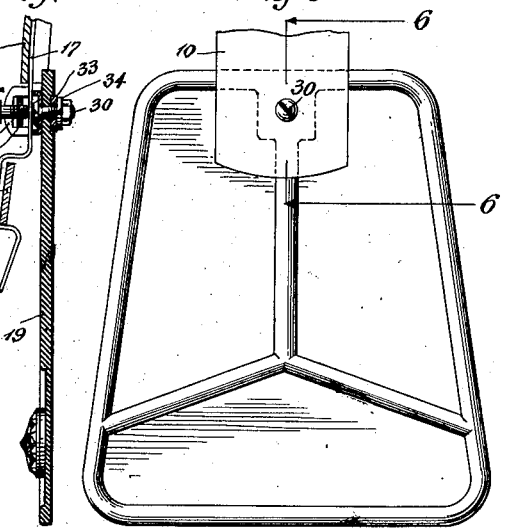
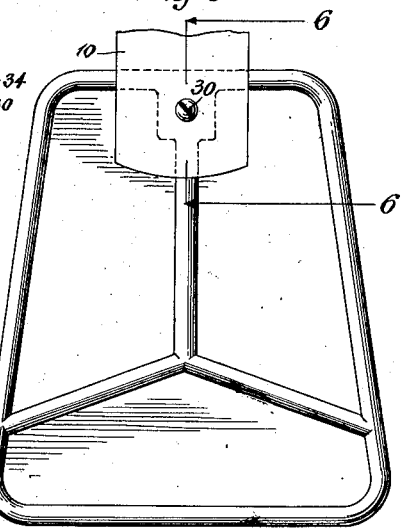
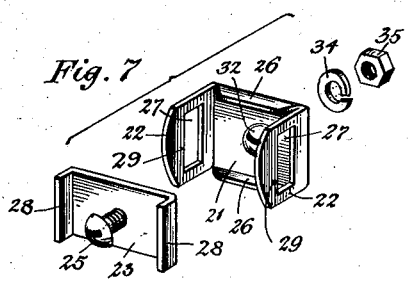
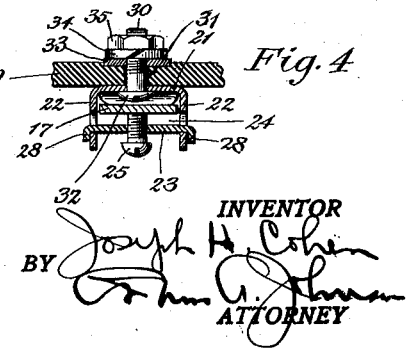
INVENTOR
Joseph H. Cohen
BY
ATTORNEY Patented Aug. 31, 1937

2,091,910

UNITED STATES PATENT OFFICE 2,091,910

SPLASH GUARD

Joseph H. Cohen, Bridgeport, Conn., assignor to Casco Products Corporation, Bridgeport, Conn., a corporation of Connecticut Application August 17, 1935, Serial No. 36,685

12 Claims. (Cl. 208—141)

This invention relates to splash guards, and more particularly, to a splash guard for use in bicycles.

An object of this invention is to provide a splash guard which may be easily and quickly attached to the rear of a bicycle so as to form a continuation of the rear mudguard or fender, and yet be flexible so that it will yield when struck by the curb or other protuberances from the ground or road.

Bicycles usually carry on the lower end of the rear fender a clip for the purpose of holding the supporting stand elevated while the bicycle is in use. This clip comprises an elongated bar extending downwardly from the lower edge of the rear fender.

Instead of fastening the apron to the rear fender itself, the present invention provides means whereby the apron may be secured to this downwardly projecting bar, i. e., the clip, and this is one of the important features of the present invention.

For this purpose, the present invention provides a socket member on the upper end of the apron to receive and be clamped to the stand clip.

Usually, the clip is irregular in shape, having a depression to receive the horizontal portion of the stand, and hence, to enable the splash guard to be easily and quickly mounted on the clip without requiring the clip to be made so large as to pass the protuberance on the clip, the socket-like clamping member of the present invention which receives and holds the stand clip is made of two parts, one of which is detachable from the other.

To apply the splash guard of the present invention, the detachable part of the socket is removed from the other part and the latter is moved upwardly and rearwardly between the rear surface of the tire and the clip until a straight portion of the clip lies in the portion of the socket attached to the apron. Then the removable portion of the socket is returned thereto so as to lie over the rear surface of the clip, and a screw or other draft member carried by the removable portion is then adjusted to engage the rear surface of the clip and draw the front portion of the socket firmly against the front surface of the clip. The draft screw when firmly engaging the rear surface of the stand clip or the front portion of the socket holds the removable portion of the socket against removal therefrom.

The front wheel fender of the bicycle may be provided with a downwardly extending member such as the clip used at the rear, but usually no such member is provided. Hence, to fasten a splash guard to the lower end of the front fender, it is usually necessary to punch a hole therein and secure the apron thereto by means of a bolt.

According to the present invention, the socket at the upper end of the splash guard is removably secured to the apron by a bolt. By removing the bolt, the socket may be removed, and this bolt may be used for fastening the apron to the apertured lower end of the fender.

Other features and advantages will hereinafter appear.

In the accompanying drawing which illustrates one form of this invention, that at present preferred—

Figure 1 is a side elevation of the bicycle showing the splash guards of the present invention applied to both the front and rear fenders.

Fig. 2 is a rear elevation of the lower portion of the rear fender showing the splash guard of the present invention attached thereto.

Fig. 3 is a sectional view taken substantially on the line 3—3 of Fig. 2.

Fig. 4 is a horizontal sectional view taken on the line 4—4 of Fig. 2, and showing the stand clip located in the socket at the upper end of the apron of the present invention.

Fig. 5 is a rear elevation of the lower end of the front fender showing the splash guard of the present invention applied thereto.

Fig. 6 is a vertical sectional view taken on line 6—6 of Fig. 5.

Fig. 7 is an exploded view of the clamping device of the present invention.

As shown in the accompanying drawing, bicycles have front fenders 10 and rear fenders 11 tending to prevent mud, water and other foreign matter to be thrown against the rider by the wheels 12. Also, most bicycles are provided with a stand 13 pivotally mounted on the frame of the bicycle and having side arms 14 and a rear arm 15 (see Fig. 3). When the bicycle is out of use, the ends of the side arms 14 and the surface of the cross arm 15 are in engagement with the ground, and since the side arms spread as they extend downwardly, the bicycle is supported in a vertical position in the well known manner.

When the bicycle is in use, however, the stand 13 is swung upwardly so that the cross member 15 is engaged in a recess 16 of a clip 17 secured to the lower end 18 of the rear fender 11.

To further protect the rider against mud, water, and other foreign matter thrown up by the rear wheel 12, it has been proposed heretofore to secure a flexible apron to the lower end 18 of the fender, but this required perforating the fender for the reception of a bolt.

Instead of fastening the splash guard to the lower end of the fender as was heretofore customary, the present invention provides a splash guard which may be applied to the stand clip 17 which comprises, as shown, a narrow downwardly extending strip of metal bent to provide the socket 16 into which the cross bar 15 of the stand extends, the strip being resilient to permit it to be swung outwardly as the crossbar 15 is swung upwardly and rearwardly.

Accordingly, the apron 19 provided by the present invention has secured at its upper end a socket-like clamping member 20 to receive and engage the clip 17.

This clamping member comprises a front plate 21 having lateral rearwardly projecting ears or flanges 22 and a back plate 23 forming between them a rectangular space 24 through which the sap-like clip 17 may extend. The back plate 23 is provided with a screw 25 which, upon being turned inwardly, engages the rear face of the clip 17 and draws the back plate 21 firmly against the front face of the clip to secure the clip in the socket.

To make the clamping action of the screw and front plate 21 more effective and for another purpose to hereinafter appear, the front plate is provided with upper and lower flanges 26, and the screw 25 is located on the back plate so that its axis is midway between the flanges 26. Thus, when the screw 25 is tightened, the material of the strip is slightly bowed forwardly from the point where it engages the flanges 26 to the point where it is engaged by the screw, thereby increasing the holding action of the socket on the clip.

Since most clips for holding stands have the socket 16 for engaging the cross bar 15 and since the protuberance produced by the socket is considerable, the clamping member 20 of the present invention on the splash apron 19 would have to be made quite large in order to permit the enlarged portion of the clip to be inserted downwardly through the socket.

To avoid this and to further increase the ease with which the splash guard may be applied to the clip 17, the clamping member 20 of the present invention is so provided that the back plate 23 may be removed. For this purpose, the side ears 22 of the front plate are provided with elongated slots 27 and the back plate is made long enough to extend through these slots, and at its side edges has flanges 28 which engage the outside rear margins 29 of the slots 27.

Thus, when the rear plate 23 is held by the screw 25 at the limit of its rearward movement, the ears 28 securely hold the plate 23 against lateral movement relative to the front plate in any direction. This condition is shown in Fig. 4 in which the rear plate 23 is held in its immovable position relative to the front plate 21 by the screw 23 engaging the strap 17.

As manufactured and shipped, the end of the screw engaging another part to be described, performs this function of holding the removable plate 23 against casual separation from the front plate. The slots 27 are, of course, of sufficient size to permit the ears 28 to pass inwardly therethrough when the screw is retracted, and in removing the plate 23, said plate is moved first to one side to permit the ear on that side to pass through the slot 27, and then the plate is tilted and moved to the other side to permit the other ear to pass through its associated slot 27.

In the broader aspects of this invention, the clamping member 20 may be secured to the apron 19 in any suitable manner.

However, in the preferred form, the clamping member 20 is removably mounted on the apron. This is accomplished by means of a screw 30 passing forwardly through the clamping member 20 and a hole 31 in the upper end of the apron 19. The head 32 of the screw engages the rear face of the plate 21 and on the forward end of the screw there is provided a washer 33, a split washer 34 and a nut 35.

The clamping member is thus rotatably supported on the upper end of the apron and should the stand supporting clip be bent sidewise, the nut 35 may be loosened and the clamping member 20 may be swung on the axis of the screw 30 to cause the apron 19 to hang plumb.

The upper and lower flanges 26, in addition to having the function above referred to, cause the clip 17 to engage the front plate 21, rather than the head 32 of the screw.

By having the clamping member 20 removably carried by the apron by means of the screw 30 and nut 35 forming a bolt, should it be desired to fasten the apron 19 directly to the fender as is the usual case with the front fender 10 by removing the plate 23, the screw and nut 30 may be loosened to permit the removal of the screw from the apron. After punching a hole in the lower end of the fender, the screw 30, washers 33 and 34, and nut 35 may be employed to secure the apron to the fender, the clamping member being discarded, if desired (see Fig. 6).

It will be noted that by fastening the splash guard to the clip just below the bottom end 18 of the fender 11, the operation and function of the stand 13 and the stand clip 17 is not interfered with in any way, it being merely necessary to swing the lower end of the flexible splash guard forwardly at the time that the stand is swung upwardly and rearwardly.

Variations and modifications may be made within the scope of this invention and portions of the improvements may be used without others.

Having thus described the invention, what is claimed as new and for which it is desired to obtain Letters Patent, is:—

1. A splash guard for bicycles having a stand-retaining clip including a downwardly projecting bar at the lower edge of the mudguard of the bicycle, said splash guard comprising an apron, and clasping means including a socket member carried by the upper end of the apron to receive said downwardly projecting bar and a clamping member carried by said socket member to secure said projecting bar in said socket member.

2. A splash guard for bicycles having a downwardly projecting bar at the lower edge of the mudguard thereof, comprising an apron, and means for detachably securing the apron to said downwardly projecting bar of the bicycle, said means comprising a front plate carried by the upper end of the apron and having side flanges between which said downwardly projecting bar is received and located, a back plate carried by said flanges and extending across said front plate and the projecting bar, and a screw on the back plate to engage the back of the projecting bar and draw the front plate tightly against the front of the projecting bar.

3. A splash guard for bicycles having a downwardly projecting bar at the lower edge of the mudguard thereof, comprising an apron, and means for detachably securing the apron to said downwardly projecting bar of the bicycle, said means comprising a front plate carried by the upper end of the apron and having side flanges between which said downwardly projecting bar is received and located, a back plate carried by said flanges and extending across said front plate and the projecting bar, and a screw on the back plate to engage the back of the projecting bar and draw the front plate tightly against the front of the projecting bar, said front plate having a pair of horizontal flanges engaging said bar and said screw engaging said bar midway between said flanges whereby the bar is bowed when the screw is tightened.

4. A splash guard for bicycles having a stand-retaining clip including a downwardly projecting bar at the lower edge of the mudguard of the bicycle, said splash guard comprising an apron, a single clamping unit for clasping said downwardly projecting bar, and a screw passing through the central upper portion of the apron to removably secure the clamping unit to the apron.

5. A splash guard for bicycles having a downwardly projecting bar on the lower edge of the mudguard thereof, comprising an apron, a single clamping unit for engaging said downwardly projecting bar, a screw passing through the central upper portion of the apron to removably secure the clamping unit to the apron, said screw removably extending through the clamping unit and the apron and being adapted to extend through an aperture in the lower end of the mudguard to secure the apron to the mudguard without the use of said clamping unit, if desired.

6. A splash guard for bicycles having a downwardly projecting bar at the lower edge of the mudguard thereof, comprising an apron, and means including a socket member carried by the upper end of the apron to receive the downwardly projecting bar, said socket having one wall thereof removable to permit lateral insertion of the projecting bar into the socket.

7. A splash guard for bicycles having a downwardly projecting bar at the lower edge of the mudguard thereof, comprising an apron, and means for detachably securing the apron to said downwardly projecting bar of the bicycle, said means comprising a front plate carried by the upper end of the apron and having side flanges between which said downwardly projecting bar is received and located, a back plate carried by said flanges and extending across said front plate and the projecting bar, and a screw on the back plate to engage the back of the projecting bar and draw the front plate tightly against the front of the projecting bar, said back plate being mounted on the front plate for removal to permit lateral insertion of the projecting bar between the side flanges of the front plate.

8. A splash guard for bicycles having a downwardly projecting bar at the lower edge of the mudguard thereof, comprising an apron, and means for detachably securing the apron to said downwardly projecting bar of the bicycle, said means comprising a front plate carried by the upper end of the apron and having side flanges between which said downwardly projecting bar is received and located, a back plate carried by said flanges and extending across said front plate and the projecting bar, and a screw on the back plate to engage the back of the projecting bar and draw the front plate tightly against the front of the projecting bar, the flanges on the front plate being slotted and the back plate having its ends removably mounted in said slots.

9. A splash guard for bicycles having a downwardly projecting bar at the lower edge of the mudguard thereof, comprising an apron, and means for detachably securing the apron to said downwardly projecting bar of the bicycle, said means comprising a front plate carried by the upper end of the apron and having side flanges between which said downwardly projecting bar is received and located, a back plate carried by said flanges and extending across said front plate and the projecting bar, and a screw on the back plate to engage the back of the projecting bar and draw the front plate tightly against the front of the projecting bar, the flanges on the front plate being slotted and the back plate having its ends removably mounted in said slots, and having ears to prevent lateral movement of the back plate when the latter engages the rear margins of said slots.

10. A splash guard for bicycles having a stand-retaining clip including a downwardly projecting bar at the lower edge of the mudguard of the bicycle, said splash guard comprising an apron, a clamping unit carried by the upper end of the apron for gripping said bar and including a member having arms between which said bar is received and held against lateral movement relative to the apron.

11. A splash guard for bicycles having a stand-retaining clip including a downwardly projecting bar at the lower edge of the mudguard of the bicycle, said splash guard comprising an apron, and draft-screw operated means at the upper end of the apron for detachably securing the apron to said downwardly projecting bar of the bicycle.

12. A splash guard for bicycles having a stand-retaining clip including a downwardly projecting bar at the lower edge of the mudguard of the bicycle, said splash guard comprising an apron, and gripping means at the upper end of the apron in non-piercing engagement with the bar for detachably securing the apron to said downwardly projecting bar of the bicycle.

JOSEPH H. COHEN.